United States Patent
Sonkin et al.

(10) Patent No.: US 9,225,552 B2
(45) Date of Patent: Dec. 29, 2015

(54) MAIL SERVICE MANAGEMENT SYSTEM

(75) Inventors: Dmitry Sonkin, Redmond, WA (US);
Alireza Farhangi, Kirkland, WA (US);
Iain Frew, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 551 days.

(21) Appl. No.: 12/785,496

(22) Filed: May 24, 2010

(65) Prior Publication Data

US 2011/0289160 A1    Nov. 24, 2011

(51) Int. Cl.
*G06F 15/16* (2006.01)
*H04L 12/58* (2006.01)
*G06Q 10/10* (2012.01)

(52) U.S. Cl.
CPC ............. *H04L 12/58* (2013.01); *G06Q 10/107* (2013.01); *H04L 51/32* (2013.01)

(58) Field of Classification Search
CPC ..... H04L 12/58; H04L 67/02; H04L 67/2833; H04L 67/2838; H04L 58/14; H04L 67/327; H04L 51/32; G06Q 10/107
USPC .................. 709/206, 230, 204; 707/802, 769; 713/152; 715/752, 753
See application file for complete search history.

(56) References Cited

U.S. PATENT DOCUMENTS

| | | | |
|---|---|---|---|
| 5,805,811 A | 9/1998 | Pratt et al. | |
| 6,195,686 B1 | 2/2001 | Moon et al. | |
| 6,230,156 B1 | 5/2001 | Hussey | |
| 6,272,530 B1 * | 8/2001 | Horiuchi et al. | 709/206 |
| 6,549,612 B2 | 4/2003 | Gifford et al. | |
| 6,965,918 B1 * | 11/2005 | Arnold et al. | 709/206 |
| 7,269,624 B1 * | 9/2007 | Malik | 709/206 |
| 2004/0181580 A1 * | 9/2004 | Baranshamaje | 709/206 |
| 2007/0061476 A1 * | 3/2007 | Demsey et al. | 709/230 |
| 2007/0174392 A1 * | 7/2007 | Mohr | 709/206 |
| 2008/0215694 A1 | 9/2008 | Chen et al. | |
| 2009/0187831 A1 | 7/2009 | Tiwana et al. | |
| 2009/0228807 A1 * | 9/2009 | Lemay | 715/752 |
| 2010/0217780 A1 * | 8/2010 | Erola et al. | 707/802 |

(Continued)

FOREIGN PATENT DOCUMENTS

| | | |
|---|---|---|
| CN | 1169563 A | 1/1998 |
| CN | 101529832 A | 9/2009 |

OTHER PUBLICATIONS

Geer, David., "Cloud-Based Email", Retrieved at << http://www.processor.com/editorial/article.asp?article=articles/P3036/33p36/33p36/33p36.asp&guid >>, vol. 30, No. 36, Sep. 5, 2008, pp. 3.

(Continued)

*Primary Examiner* — Jungwon Chang
(74) *Attorney, Agent, or Firm* — Henry Gabryjelski; Kate Drakos; Micky Minhas

(57) ABSTRACT

An electronic mail management system may have a standardized interface to which different mail providers may provide an adapter. The standardized interface may have a predefined set of functions that each mail provider may provide, and the mail management system may have a user interface through which the functions may be managed. In some cases, a mail provider may have additional or customized functions that may be added to the user interface and made available to an administrator. Through the user interface, an administrator may be able to add, delete, configure, and move mailboxes, as well as other functions.

20 Claims, 4 Drawing Sheets

(56) References Cited

U.S. PATENT DOCUMENTS

2010/0325139 A1* 12/2010 Frew et al. .................... 707/769
2011/0035581 A1* 2/2011 Maller .......................... 713/152

OTHER PUBLICATIONS

"Unified E-Mail and Jabber/XMPP Instant Message (IM) Server Archive With Full-Text Search", Retrieved at << http://www.software602.com/groupware-server/unified-e-mail-and-jabber-xmpp-instant-message-im-archive-with-full-text-search/>>, Aug. 13, 2008, pp. 2.

Taylor, et al., "Trustworthy E-mail Using Secure XML Web Services", Retrieved at << http://web.science.mq.edu.au/~pwatters/01524059.pdf >>, CEC, Proceedings of the Seventh IEEE International Conference on E-Commerce Technology, Jul. 19-22, 2005, pp. 6.

Choi, et al., "Issues in Enterprise E-Mail Management", Retrieved at << http://ieeexplore.ieee.org/iel1/35/10536/00489717.pdf >>, IEEE Communications Magazine, Apr. 1996, pp. 78-82.

Whittaker, et al., "Email Overload: Exploring Personal Information Management of Email", Retrieved at << http://www.gslis.utexas.edu/~i385q/spring2005/readings/Whittaker_Sidner-1996-Email.pdf >>, Conference on Human Factors in Computing Systems, Proceedings of the SIGCHI conference on Human factors in computing systems: common ground, Apr. 13-18, 1996, pp. 276-283.

"First Office Action and Search Report issued in Chinese Patent Application No. 201110148779.8", Mailed Date: Feb. 28, 2015, 11 pages.

"Second Office Action in Chinese Patent Application No. 201110148779.8", Mailed Date: Oct. 23, 2015, 9 Pages.

* cited by examiner

MAIL SERVICE MANAGEMENT SYSTEM

BACKGROUND

Electronic mail (email) is very prevalent for business and private communication. Many businesses rely on email for a vast majority of the communication inside a company and with suppliers and customers.

Many different providers are available for email. For example, on premise email systems may have a messaging or mail server that stores email and provides mail boxes for clients to connect and access email. In addition, remotely hosted services may use the same server software but provide services from a server computer located in an offsite datacenter. Several cloud email services may also exist, where the email service comes from one of many datacenters. Each type of mail provider may have different advantages and disadvantages and may be appropriate for different situations or different types of users.

SUMMARY

An electronic mail management system may have a standardized interface to which different mail providers may provide a plugin application. The standardized interface may have a predefined set of functions that each mail provider may provide, and the mail management system may have a user interface through which the functions may be managed. In some cases, a mail provider may have additional or customized functions that may be added to the user interface and made available to an administrator. Through the user interface, an administrator may be able to add, delete, configure, and move mailboxes, as well as other functions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
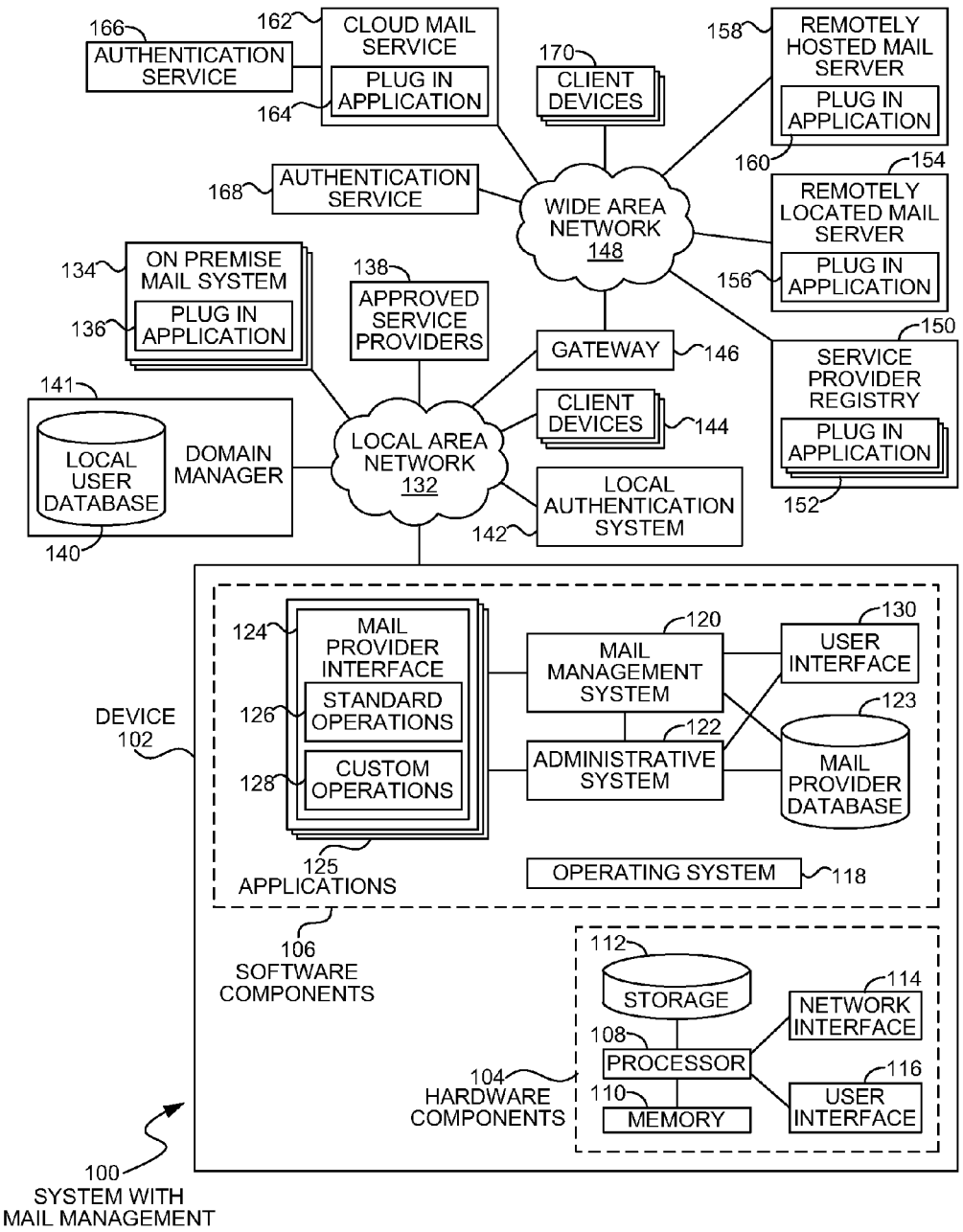
FIG. 1 is a diagram illustration of an embodiment showing a system with a mail management system.

A mail management system may be used by an administrator to manage several mail services for a business or other enterprise. The mail management system may use a standardized interface where each mail provider implements a standard set of operations. The interface may define a set of invokable operations that each mail service may have, and may be extended for additional operations.

An administrator may set up accounts or other relationships with different mail providers and may create authenticated communications sessions with a mail provider when performing one of the various operations.

A user interface may display multiple mail service providers from which an administrator may select. The administrator may perform various mailbox management operations with the mail service provider, such as adding a new mailbox, reconfiguring an existing mailbox, and deleting a mailbox.

Each mail service provider may implement a mail provider interface, which may be a definition of invokable operations. The mail provider interface may include type definitions, classes, or other definitions that may be used by a management system to communicate with the various mail service providers.

The mail provider interface may represent a common set of operations and data types that any mail provider may implement. In some cases, a mail provider may create a mail provider interface as an extension to or an application programming interface (API) to an existing mail service.

The mail provider interface may include both a set of standard operations and a set of custom operations. The standard operations may be common to all mail providers and may represent a minimum set of operations which all mail providers implement. The custom operations may be extensions to the standard operations and may represent specific operations that may not be implemented by all mail providers.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system with a management system for multiple mail providers. Embodiment 100 is a simplified example of a set of devices in a network environment with a mail management system that may allow an administrator to manage mailboxes and other messaging components from multiple mail service providers.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is a simplified example of a network environment in which a mail management system may be used to manage several different types of mail providers. A user interface may present multiple mail providers, each of which having implemented a mail provider interface. The mail provider interface may define a set of operations common to all mail providers and the user interface may allow an administrator to interact with any mail provider using the same user interface and management systems.

The mail providers may be made available to the administrator through several different mechanisms. For example, a centralized service provider registry may identify many different mail providers, each of which may implement the mail provider interface. An automated system may communicate with the service provider registry to download the mail providers and present them on a user interface for an administrator. In another example, an administrator may manually add mail providers to a list of mail providers.

The mail provider interface may define a set of named operations that may be invoked. These invokable operations may be common across all mail service providers and each mail service provider may implement every one of the operations defined in the mail provider interface. In some implementations, the mail provider interface may include data type definitions for data objects passed to and from the mail service. The mail provider interface may be an application programming interface (API) or other predefined set of operations callable from an administrative system.

The mail provider interface may define a set of operations that relate to the administration of mail services. Examples of such operations may be to add a new mailbox, reconfigure an existing mailbox, and delete a mailbox. Some embodiments may have operations for moving a mailbox, establishing or resetting user authentication credentials for a mailbox, setting access permissions to a mailbox, and other functions.

The mail provider interface may have two sets of operations: a set of standard operations and a set of custom operations. The standard set of operations may be the minimum set of operations which all mail service providers may implement, and the custom operations may be additional operations that may be available to specific mail service providers and may or may not be implemented by other mail service providers.

Because the mail provider interface may have a set of predefined and universally implemented operations, user interfaces and management systems may be created that may operate with many different types of mail server providers. From a management system design perspective, a single management system may be used to manage many different types of mail providers, such as on premise mail systems, cloud-based mail systems, remotely hosted mail systems, and others.

From an administrator perspective, the mail provider interface may allow an administrator flexibility to choose an appropriate type of mail service provider to meet a business need, and may further reduce training as each mail service provider may be accessed and managed using the same, familiar user interface.

For example, an administrator may have a group of users who work primarily in an office environment and a second group of users who may travel frequently. The users in an office environment may be assigned mailboxes on an on premise mail system while the travelling users may be assigned mailboxes on a cloud based mail service.

In another use scenario, an administrator may have user mailboxes operating with a first vendor who has remotely hosted mail services. However, a second vendor may offer increased capacity or better reliability at a lower cost. The administrator may move or migrate the mailboxes to the new vendor to achieve a cost or performance gain, while at the same time having the same user interface and management console.

In many embodiments, the mail provider interface may contain all of the information that may be used by a mail management system to access a mail provider. For example, the mail provider interface may include network connectivity information, such as web addresses for the mail provider, Internet Protocol (IP) addresses, communication protocols, or other connectivity information. The mail provider interface may also include information and metadata about the various available operations.

In some embodiments, the mail provider interface may include descriptors, data types, and other information from which a user interface may be constructed or populated. The metadata may be used to create input tools, such as drop down lists, checkboxes, or other input mechanisms and display descriptors, prompts, help explanations, or other information that may be used to display standard operations or custom operations for a user to select and use.

The mail provider interface may be implemented in two different manners. In one architecture, each mail provider may supply a plugin application that implements the mail provider interface. The plugin application may perform all communications to the mail provider and may have operations that are callable from the mail management system. In a second architecture, each mail provider may implement the mail provider interface but the mail management system may perform the communications to the mail provider. The mail management system may implement the mail provider interface as an application programming interface, for example.

A device 102 may be a device on which an administrator may manage one or more mail services. The device 102 may represent a typical computer device, such as a desktop computer or server, having hardware components 104 and software components 106. In some embodiments, the device 102 may be a laptop computer, netbook computer, tablet computer, mobile telephone, handheld personal digital assistant, game console, network appliance, or any other computing device.

The architecture illustrated for device 102 may represent a typical architecture with hardware and software components; however, other architectures may be used to implement some or all of the distributed database system.

The hardware components 104 may include a processor 108, random access memory 110, and nonvolatile storage 112. The hardware components 104 may also include a network interface 114 and a user interface 116.

The software components 106 may include an operating system 118 on which a mail management system 120 and administrative system 122 may operate. The mail management system 120 may be a specialized application that manages mail services, while the administrative system 122 may be an application from which an administrator may perform many network administrative tasks, including managing mail services.

The mail management system 120 may be an application that performs many functions relating to configuring electronic mail and other messaging systems for users. The mail management system 120 may have a user interface 130 that allows an administrator to interact with different mail services and perform many if not all administrative functions. The administrative system 122 may also perform some or all of the same functions as the mail management system 120.

In many embodiments, the administrative system 122 may perform a subset of the operations of the mail management system 120. In some embodiments, the mail management system 120 may be a subset of the administrative system 122 and may perform all of the mail related operations for the administrative system 122.

The mail management system 120 may establish a relationship with a mail service provider prior to being able to perform actions such as adding a mailbox. In an example of a mail service provided by a third party, a billing account may be set up, along with administrative credentials with which the administrator may access the mail service and perform the various administrative tasks. Once such an account is set up and operational, the mail management system 120 may be able to access the mail service.

In some embodiments, the mail management system 120 may facilitate the establishment of an administrative account with a mail service provider. For example, the mail management system 120 may have a user interface in which all available mail service providers are displayed. An administrator may be able to select one of the mail service providers and be directed to a website or other user interface through which the administrator may be able to create an administrative account. In a typical use, the administrator may enter a company name, establish a method of payment, identify one or more administrators able to access the account, and may receive administrative credentials.

The mail management system 120 may store the administrative credentials and other connection information in a mail provider database 123. The mail management system 120 may use the administrative credentials to establish connections for performing administrative functions with the mail service provider so that the administrator may not have to type in a password or present other information each time an operation is executed with the mail service provider.

For each mail service provider, the mail management system 120 may interact with applications 125 that implement a mail provider interface 124 that may include a set of standard operations 126 and custom operations 128. The applications 125 may be downloaded prior to or after establishing an administrative relationship with the mail service provider. In some embodiments, the applications 125 may be downloaded directly from the mail provider, while in other embodiments, the applications 125 may be downloaded from a service provider registry or other intermediate location.

Embodiment 100 illustrates plugin applications 125 that may operate on the device 102 and provide a translation between the mail provider interface 124 and an interface for a particular mail service provider. For each mail service provider, a different plugin application 125 may be used. The applications 125 may be routines, plugins, or other executable code that may interact with the mail management system 120 and administrative system 122. In such embodiments, the applications 125 may handle all communications between the device 102 and a mail provider.

In some embodiments, the mail provider interface 124 may be implemented by the mail service provider. In such an embodiment, the mail management system 120 or administrative system 122 may transmit the various operations and data to a mail service provider in a manner that complies with the mail provider interface. In such an embodiment, the mail management system 120 may handle all communications between the device 102 and a mail provider.

The device 102 is illustrated as connected to a local area network 132 to which an on premise mail system 134 may be located. The on premise mail system 134 may be a server or system that has mailboxes and other messaging services. The on premise mail system 134 may be part of a domain to which the device 102 and an administrator may have access. In many such local area networks, a domain manager 141 may have a local user database 140, in which device accounts and user accounts may be stored.

In some embodiments, a local authentication system 142 may authenticate users and devices to the network, such as the client devices 144 and users of the client devices 144. The local authentication system 142 is illustrated as being a separate component from the domain manager 141, but in other embodiments, the local authentication system 142 may be a component of the domain manager 141.

The local authentication system 142 may provide credentials to an administrator to access the on premise mail system 134. In one use scenario, an administrator may login to the device 102 and present administrative credentials that may be authenticated by the local authentication system 142. The administrative credentials may give the administrator access to the mail management system 120 or administrative system 122, each of which may store access credentials to the on premise mail system 134 or other, off premise mail systems. In some cases, the administrator's user credentials may be presented to the on premise mail system 134, which may verify the credentials with the local authentication system 142.

In some embodiments, a local database may store approved service providers 138. The approved service providers 138 may be those mail service providers with which an administrative account may have been established. In such an embodiment, a mail management system 120 and administrative system 122 may access the approved service providers 138 to populate a list of mail service providers. The list may reflect those service providers with which operations may be performed.

The local area network 132 may be connected to a gateway 146 and may connect to a wide area network 148. The wide area network 148 may be the Internet or other wide area network, and may have various servers and devices that are outside of a domain defined by the local area network 132.

In some embodiments, a service provider registry 150 may be a central location where different mail service providers may identify themselves. In some embodiments, the mail service providers may download their plugin applications 152. A mail management system, such as the mail management system 120, may connect to the service provider registry 150 to identify any mail service providers.

In some embodiments, a web interface or other software interface may allow an administrator to search the service provider registry 150 to find mail services that meet certain criteria, such as location, price, feature set, or other criteria. Once a selection is made, an administrator may establish an administrative account and add the plugin application 152 to the set of plugin applications 125 on the device 102. In some embodiments, the newly added mail provider may be added to the approved service providers 138.

In other embodiments, the mail management system 120 may connect to the service provider registry 150 and download a list of available service providers. From the mail management system 120, an administrator may be able to browse a list of mail providers to which an administrative account has already been established as well as those mail providers for which no prior relationship has been formed.

An example of a mail provider may be a remotely located mail server 154. The remotely located mail server 154 may be a server that may be located in a datacenter or network operations center and may be located offsite from a company's premises. Such a configuration may be useful to provide physical security to the email server as well as improved Internet connectivity, for example. The remotely located mail server 154 may have a downloadable plugin application 156.

Another example of a mail provider may be a remotely hosted mail server 158, which may also have a downloadable plugin application 160. A remotely hosted mail server 158 may be a virtual machine that may or may not be shared with other users.

In still another example of a mail provider may be a cloud mail service 162, which may also have a downloadable plugin application 164. The cloud mail service 162 may or may not have a notion of a server and may present an application programming interface (API) or other connection mechanism.

For each of the various types of mail services, an application or plugin may implement the mail provider interface for the mail management system 120. The application or plugin may present the operations defined by the mail provider interface so that the mail management system 120 may transmit and receive commands and data across the interface. Once the commands and data are received, the application may translate the commands and data into commands and data that may be received by the various mail providers.

In some embodiments, a mail service provider may have its own authentication service, such as the authentication service 166 provided by the cloud mail service 162. Other embodiments may use a remote authentication service 168. In a domain environment, a domain controller may provide a local authentication system 142 to which each user may authenticate. Typically, a mail service provided by a third party may or may not be able to connect to the local authentication system 142 to authenticate a user, and therefore may use a second authentication system.

When a second authentication system is used, a new mailbox may be created on the mail service and the user's login credentials may be transmitted to the remote mail service. The remote mail service may receive the user's credentials and establish the user access using the credentials. In some embodiments, a synchronization mechanism may update any changes to a user's credentials on a local authentication system 142 with that stored on a second authentication system.

Figure 2:
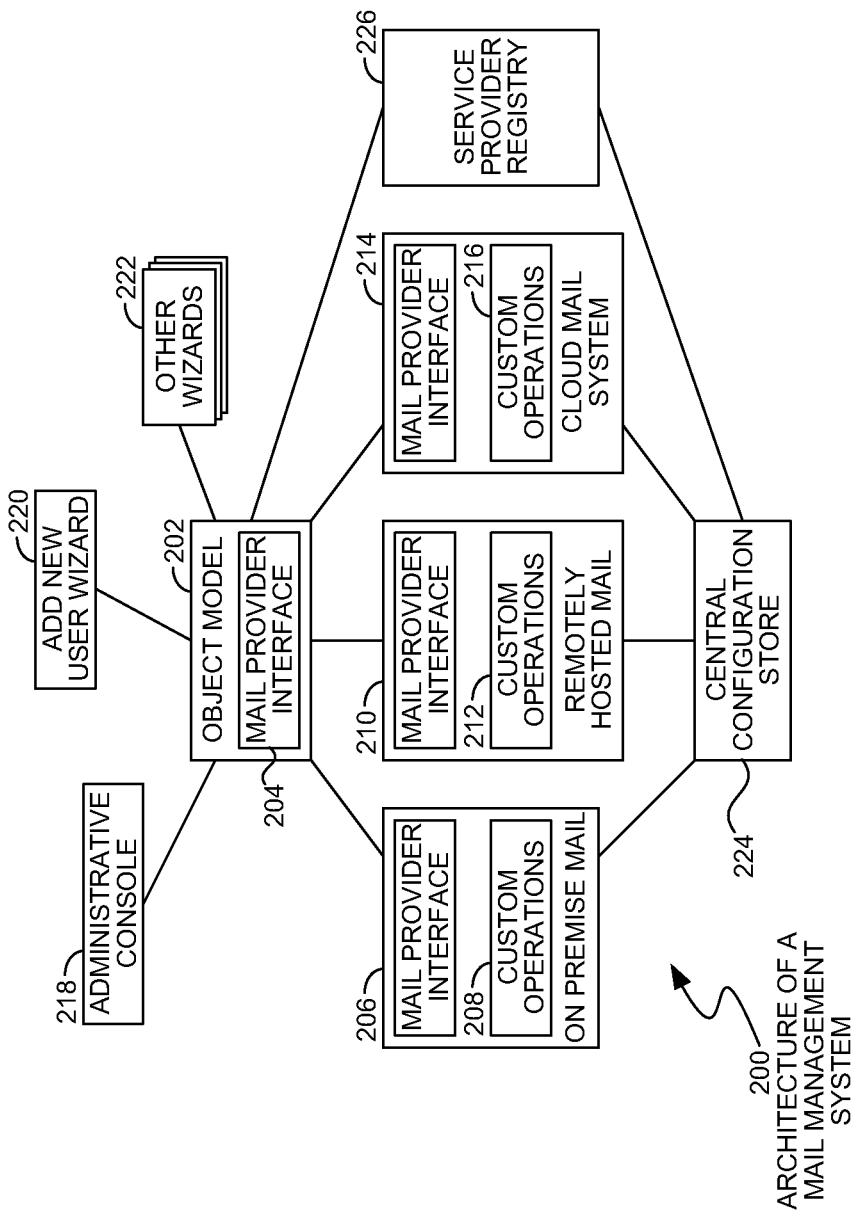
FIG. 2 is a diagram illustration of an embodiment showing an example architecture of a mail management system.

FIG. 2 is a diagram of an embodiment 200, showing an architecture of a mail management system. Embodiment 200 illustrates a simplified illustration of a software architecture that includes an object model with a mail provider interface.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 200 illustrates an architecture of a mail management system that may use a mail provider interface. An object model 202 may implement a mail provider interface 204. An on premise object 206 may also implement the mail provider interface and may also have custom operations 208. The on premise object 206 may be bound to the object model 202 through the mail provider interfaces.

The on premise object 206 may be a set of executable operations that are contained in a plugin application. The plugin application may be installed and linked to the object model 202.

Similarly, a remotely hosted mail object 210 may be bound to the object model 202 and may implement the mail provider interface. The remotely hosted mail object 210 may include some custom operations 212. Likewise, a cloud mail system object 214 may be bound to the object model 202 and may implement the mail provider interface 204. The cloud mail system object 214 may include custom operations 216.

An administrative console 218, add new user wizard 220, or other wizards 222 may be bound to the object model 202. The various bindings may cause the objects to be linked together so that an operation in the administrative console 218, for example, may be performed by the respective mail provider.

The various objects may be stored in a central configuration store 224 which may include all of the various objects and information for the various mail services that may be available, active, or installed.

A service provider registry 226 may contain a list of available mail service providers. In some cases, the service provider registry 226 may contain object models for many different mail service providers, including those mail service providers that are not installed into the system.

Figure 3:
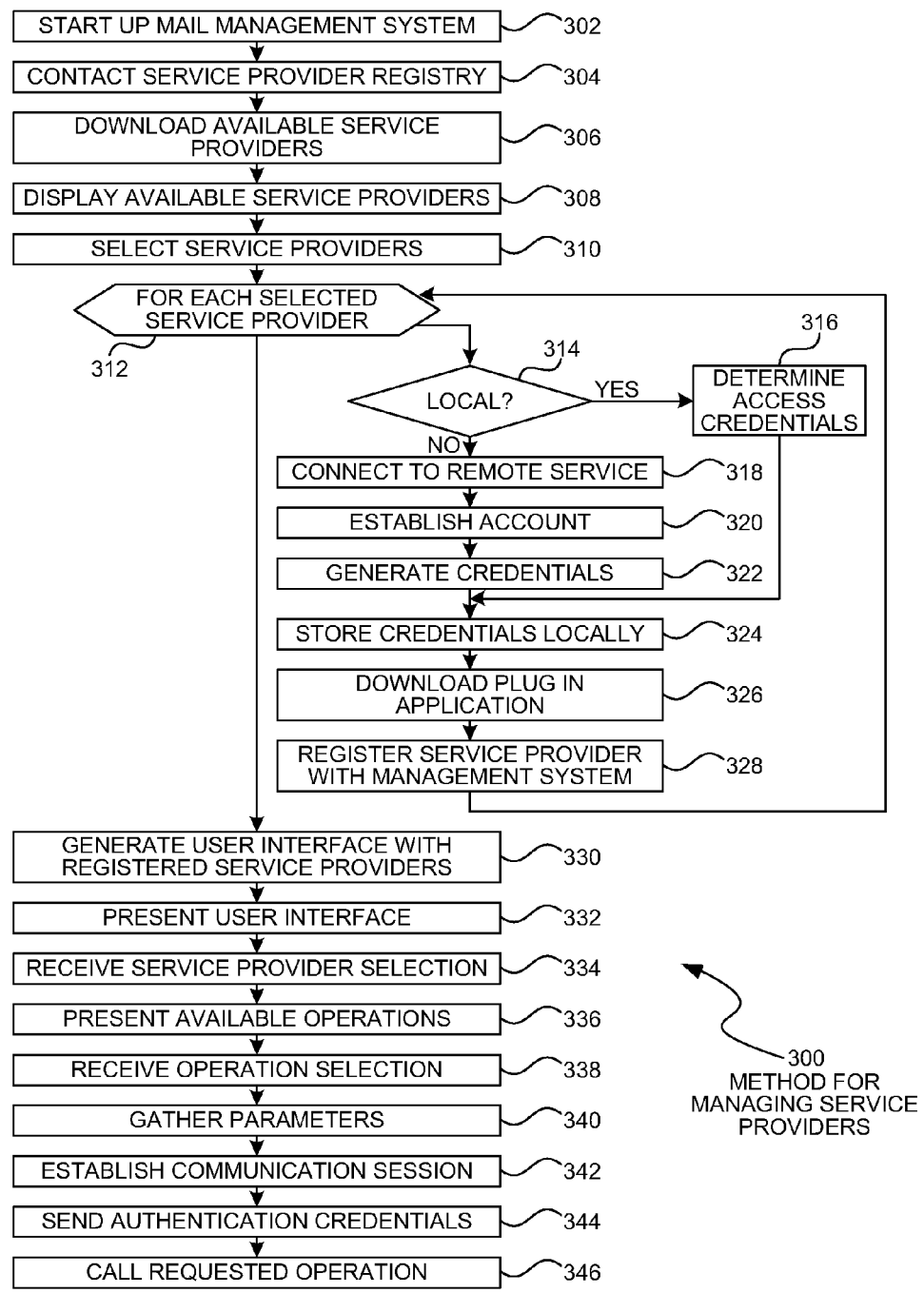
FIG. 3 is a flowchart illustration of an embodiment showing a first method for managing service providers.

FIG. 3 is a flowchart illustration of an embodiment 300 showing a method for managing service providers. The operations of embodiment 300 may be performed by a management device or application, such as the mail management system 120 or administrative system 122 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of a method for managing mail service providers where the service providers are first selected and configured for use. After configuration, the service providers can be selected and have an operation performed, such as adding a new mailbox. Embodiment 300 illustrates the management operation in two major steps: selecting and configuring service providers, then operating with the configured service providers.

Embodiment 400, presented later in this specification, illustrates a different method where similar steps are performed, but in a different sequence. In embodiment 400, service providers that are both configured and not configured may be presented to an administrator. When the administrator selects one of the service providers to perform an operation, that service provider may be configured if it is not already.

In block 302, a mail management system may be started up and may contact a service provider registry in block 304. From the service provider registry, the mail management system may download available service providers in block 306.

In some embodiments, locally available mail service providers may be searched. In an example with a mail server in a local domain, the mail management system may search for any mail providers within the domain and retrieve metadata about the local mail providers in addition to the information downloaded from the service provider registry.

The downloaded information in block 306 may be merely metadata that describes the available service providers. In other embodiments, the downloaded information may include plugin applications for each of the available service providers.

The available service providers may be displayed in block 308, and an administrator may select one or more of the service providers in block 310. Each service provider may be processed in block 312.

For every selected service provider in block 312, if the mail service provider is within a local domain in block 314, access credentials for the mail service may be determined in block 316. In many embodiments, the access credentials may be included in the information downloaded from the mail service. In other embodiments, the access credentials may be determined by performing a query against the mail service.

If the mail service provider is not local in block 314, a connection may be established to the mail service provider in block 318. An administrator may establish an account in block 320 by providing payment information, contact information, and any other information that may be asked by a service provider.

In some embodiments, the operations of block 320 may be performed outside of a mail management system. For example, a web browser may be used to display an interactive website for the administrator to establish an account.

Once the account is established, administrative credentials may be generated in block 322. The administrative credentials may be defined by the mail service provider in some cases or by the mail management system in other cases.

The credentials from either the remote or local mail service may be stored locally in block 324. A plugin application may be downloaded in block 326. In some embodiments, the plugin application may be downloaded from the mail service provider, while in other cases, the plugin application may be downloaded from a service provider registry or other intermediate location.

The service provider may be registered with the mail management system in block 328. The process may return to block 312 to process additional service providers.

At this point in the process of embodiment 300, one or more mail service providers may have accounts established and registered with the mail management system. The operations of blocks 302 through 328 may be performed once during the initial configuration of the mail management system and the remaining blocks of embodiment 300 may be performed as a normal operation of the mail management system.

In block 330, a user interface may be generated with registered service providers, and the user interface may be presented in block 332. A user may select a service provider in block 334, and the mail management system may present the available operations for the mail service provider in block 336. In cases where the mail service provider has one or more optional or custom operations, the custom operations may be displayed for an administrator to select.

In some embodiments, the user interface in block 330 may be created or supplemented by metadata contained in a plugin application or other metadata. The user interface may contain descriptors defined in the metadata, as well as data types that may be used to select user interface mechanisms such as text input boxes, radio buttons, drop down lists, or other mechanisms.

An administrator may select an operation to perform in block 338. The mail management system may gather parameters related to the operation in block 340. The parameters may be gathered from different sources, including databases, domain management systems, authentication systems, and user input.

A communication session may be established with the service provider in block 342 and administrator authentication credentials may be transmitted in block 344. Once an authenticated session is established in blocks 342 and 344, the requests operation may be called in block 346.

The operations of blocks 330 through 346 may represent an embodiment where a communication session may be established by the device containing the mail management system. In some embodiments, the operations of blocks 342 through 346 may be performed by a plugin application.

In many cases, the requested operation may transmit user credentials, such as a user name and password. For example, an operation of creating a new mailbox for a user may involve transmitting the user credentials to a remote mail service. The user credentials may be retrieved from a local authentication system and transmitted to the remote mail service. In some embodiments, a synchronization mechanism may be used to synchronize the remote authentication mechanism with a local authentication mechanism so that a user may not have to manage passwords in two different locations.

Figure 4:
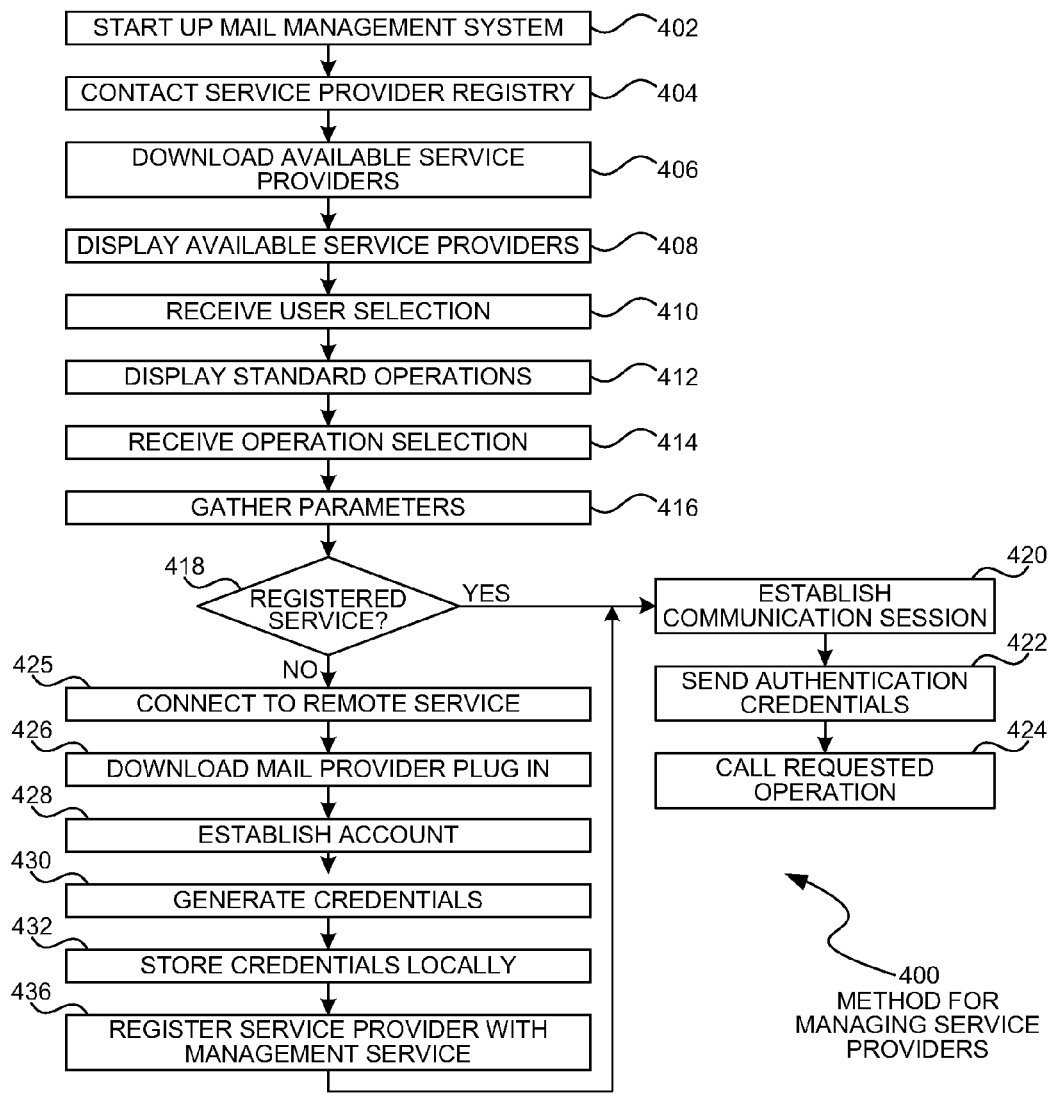
FIG. 4 is a flowchart illustration of an embodiment showing a second method for managing service providers.

FIG. 4 is a flowchart illustration of an embodiment 400 showing a method for managing service providers. The operations of embodiment 400 may be performed by a management device or application, such as the mail management system 120 or administrative system 122 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates another method for managing mail services that performs many of the same steps as embodiment 300, but in a different sequence.

The mail management system may be started in block 402 and may contact a service provider registry in block 404 to download available service providers in block 406.

The available service providers may be displayed in block 408, and a user may select a service provider in block 410. For the selected service provider, a set of operations may be displayed in block 412, and an administrator may select one of the operations in block 414. Parameters related to the operation may be gathered in block 416.

If the selected service is a registered service in block 418, a communication session may be established with the service provider in block 420 and the administrative authentication credentials may be transmitted in block 422 to create an authenticated connection. Once the session is established, the requested operation may be called in block 424.

If the selected service is not a registered service in block 418, embodiment 400 may attempt to register the service, beginning with connecting to the remote service in block 425 and downloading a mail provider plugin in block 426.

The administrator may establish an account with the selected service provider in block 428, and administrator credentials may be generated in block 430. The credentials may be stored locally in block 432.

The administrator credentials may take different forms in different embodiments. In some cases, the administrator credentials may be a user name and password. In other cases, the administrator credentials may include a certificate or other type of credentials.

In block 436, the service provider may be registered with the mail management service. The process may return to block 420 to establish a communication session and transmit the operation to the mail service.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on a computer processor, said method comprising:
   identifying a plurality of mail providers complying with a standardized email interface comprising a definition of a plurality of invokable standard mailbox management operations directed to mail service administration;
   presenting each of said plurality of mail providers in a user interface;
   receiving a selection for a first mail provider;
   presenting at least one of said invokable standard mailbox management operations as an option in a user interface configured to allow an administrator of an enterprise to manage mailboxes from the plurality of mail providers for a group of users of the enterprise to provide the mail service administration for the group of users of the enterprise;
   receiving a selection for a first invokable standard operation of the plurality of invokable standard mailbox management operations; and
   calling, across the standardized email interface, said first invokable standard operation from said first mail provider.

2. The method of claim 1, said identifying a plurality of mail providers comprising:
   connecting to a service provider registry; and
   receiving said plurality of mail providers from said service provider registry.

3. The method of claim 1, said plurality of invokable standard mailbox management operations comprising:
   add a new mailbox;
   delete an existing mailbox; and
   change a setting relating to an existing mailbox.

4. The method of claim 3, at least one of said mail providers being an offsite mail provider.

5. The method of claim 1 further comprising:
   prior to said calling said first invokable operation, presenting authentication credentials to said first mail provider to establish a communications session, and performing said calling said first invokable standard operation within said communications session.

6. The method of claim 1 further comprising:
   establishing a trusted relationship with said first mail provider, said trusted relationship being established prior to said calling said first invokable standard operation or prior to said presenting each of said plurality of mail providers in said user interface.

7. The method of claim 1 further comprising:
   receiving a set of extensions comprising a set of invokable operations not comprised in said interface; and
   presenting at least one of said invokable operations in said set of extensions in said user interface.

8. The method of claim 1, wherein the standardized mail interface is configured as an application programming interface.

9. The method of claim 1, wherein the standardized mail interface is implemented via an object model such that the definition is specified via classes of the object model.

10. A method performed on a computer processor, said method comprising:
    identifying a plurality of mail providers complying with a standardized email interface comprising a definition of a plurality of invokable standard mailbox management operations directed to mail service administration;
    presenting each of said plurality of mail providers in a user interface;
    receiving a selection for a first mail provider;
    presenting at least one of said invokable standard mailbox management operations as an option in a user interface;
    receiving a selection for a first invokable standard operation of the plurality of invokable standard mailbox management operations; and
    calling, across the standardized email interface, said first invokable standard operation from said first mail provider,
    wherein at least one of said plurality of invokable standard mailbox management operations is selected from the group consisting of (a) transmitting a set of user credentials to a mail provider, (b) adding a second new mailbox, (c) reconfiguring a third existing mailbox, (d) deleting a fourth mailbox, (e) moving a fifth mailbox, (f) establishing user authentication credentials for a sixth mailbox, (g) resetting user authentication credentials for a seventh mailbox, and (h) setting access permissions to an eighth mailbox.

11. A system comprising:
a processor;
a mail management system that:
 identifies a plurality of mail providers complying with an email interface comprising a definition of a plurality of invokable standard mailbox management operations directed to mail service administration;
 presents each of said plurality of mail providers in a user interface;
 receives a selection for a first mail provider;
 presents at least one of said invokable standard mailbox management operations as an option in a user interface configured to allow an administrator of an enterprise to manage mailboxes from the plurality of mail providers for a group of users of the enterprise to provide the mail service administration for the group of users of the enterprise;
 receives a selection for a first invokable standard operation of the plurality of invokable standard mailbox management operations; and
 calls, across the standardized email interface, said first invokable standard operation from said first mail provider.

12. The system of claim 11 further comprising:
a connection to a user database; and
a connection to a first user authentication system.

13. The system of claim 12, said mail management system that further:
 identifies a user associated with a first mailbox, said user having a user record in said user database;
 receives user credentials from said first user authentication system; and
 transmits said user credentials to said first mail provider as part of calling said first invokable operation.

14. The system of claim 13, said first mail provider comprising a second user authentication system.

15. The system of claim 14, said second user authentication system being synchronized with said first user authentication system.

16. The system of claim 15, said mail management system that further:
 receives administrative credentials from said first user authentication system; and
 transmits said administrative credentials to said first mail provider as part of calling said first invokable standard operation.

17. A method performed on a computer processor, said method comprising:
 identifying a plurality of mail providers complying with an email interface comprising a definition of a plurality of invokable standard mailbox management operations directed to mail service administration;
 presenting each of said plurality of mail providers in a user interface;
 receiving a selection for a first mail provider from said user interface;
 presenting at least one of said invokable standard mailbox management operations as an option in a user interface configured to allow an administrator of an enterprise to manage mailboxes from the plurality of mail providers for a group of users of the enterprise to provide the mail service administration for the group of users of the enterprise;
 receiving a selection for a first invokable standard operation of the plurality of invokable standard mailbox management operations; and
 establishing an authenticated communication session with said first mail provider and as part of said authenticated communication session, calling, across the standardized email interface, said first invokable standard operation from said first mail provider.

18. The method of claim 17 further comprising:
identifying a first invokable operation provided by said first mail provider, said first invokable operation being not comprised in said email interface; and
presenting said first invokable operation in said user interface.

19. The method of claim 18 further comprising:
for each of said plurality of mail providers, establishing an administrative contract prior to said presenting each of said plurality of mail providers in said user interface.

20. A non-transitory computer readable storage medium not comprising a propagated wave but comprising computer executable instructions configured to perform the method of claim 17.

* * * * *